United States Patent
Jacquin et al.

(10) Patent No.: US 6,625,217 B1
(45) Date of Patent: Sep. 23, 2003

(54) CONSTRAINED WAVELET PACKET FOR TREE-STRUCTURED VIDEO CODERS

(75) Inventors: Arnaud Eric Jacquin, Manhattan, NY (US); Hosam Adel Khalil, Goleta, CA (US); Christine Irene Podilchuk, Bridgewater, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/418,858

(22) Filed: Oct. 15, 1999

(51) Int. Cl.[7] .............................................. H04N 7/12
(52) U.S. Cl. ................................................ 375/240.19
(58) Field of Search ............ 375/240.01, 240.18–240.2, 375/240.24, 240.08–240.11; 382/232, 240–243, 248–250, 238; H04N 7/12

(56) References Cited

U.S. PATENT DOCUMENTS

| | | | |
|---|---|---|---|
| 5,563,960 A | * 10/1996 | Shapiro | 382/240 |
| 5,604,824 A | * 2/1997 | Chui et al. | 382/248 |
| 5,764,805 A | * 6/1998 | Martucci et al. | 382/234 |
| 5,764,807 A | * 6/1998 | Pearlman et al. | 382/240 |
| 6,125,201 A | * 9/2000 | Zador | 382/248 |
| 6,154,493 A | * 11/2000 | Acharya et al. | 375/240.19 |
| 6,157,746 A | * 12/2000 | Sodagar et al. | 382/240 |
| 6,263,109 B1 | * 7/2001 | Ordentlich et al. | 382/240 |
| 6,266,414 B1 | * 7/2001 | Bradley et al. | 382/248 |
| 6,272,180 B1 | * 8/2001 | Lei | 375/240.18 |

OTHER PUBLICATIONS

"Best Wavelet Packet Bases In a Rate–Distortion Sense"; Kannan Ramchandran and Martin Vetterli, IEEE Transaction On Image Processing, vol., 2, Apr. 1993 pp 160–175.

"Image Coding Using Wavelet Transform"; Marc Antonini, et al.; IEEE Transactions On Image Processing, vol. 1, No. 2 Apr. 1992 pp 205–220.

"Embedded Image Coding Using Zerotrees Of Wavelet Coefficients", Jerome M. Shapiro; IEEE Transactions On Signal Processing, vol. 41, No. 12, Dec. 1993 pp. 3445–3462.

"A New, Fast, And Efficient Image Codec Based On Set Partitioning In Hierarchical Trees"; Amir Said, et al.; IEEE Transactions On Circuits And Systems For Video Technology, vol. 6. No. 3, Jun. 1996 pp. 243–250.

* cited by examiner

Primary Examiner—Richard Lee (57) ABSTRACT

A method for optimizing a wavelet packet structure for subsequent tree-structured coding which preserves coherent spatial relationships between parent coefficients and their respective four offspring at each step. A valid frequency tree is defined by a wavelet packet decomposition algorithm. Constraints are placed on the pruning of the frequency tree in order to select valid frequency trees as each step. These constraints include considering any four offspring sub-bands as candidates for pruning only when their current frequency decomposition level is the same as that of their respective spatially co-located parent sub-band, and pruning the spatially co-located offspring sub-bands when pruning only the parents results in an invalid wavelet packet structure.

6 Claims, 6 Drawing Sheets

Constrained Wavelet Packet Algorithm

Constrained Wavelet Packet Algorithm

CONSTRAINED WAVELET PACKET FOR TREE-STRUCTURED VIDEO CODERS

BACKGROUND OF THE INVENTION

1. Field of the Invention

The present invention relates to image and video coding and decoding and more particularly, it relates to a method for optimizing a wavelet packet structure for subsequent tree-structured coding.

2. Description of the Related Art

A. General

Current technology is leading toward the transmission of higher quality images to the consumer public. An example of such transmissions is digital video transmission via satellites and the evolution of High-definition television (HDTV). The transmission of images at such high resolution requires compression (coding), on the senders end, and decompression on the receiving end.

Generally, two classes of image coding algorithms typically provide excellent performance on images: (i) tree-structured wavelet based algorithms (Class I); and (ii) frequency and space-frequency adaptive algorithms (Class II). Both the Class I and Class II algorithms are very good at exploiting interband correlation in wavelet decomposition by efficiently representing strings of insignificant coefficients (referred to as zerotrees or spatial hierarchical trees).

In Class I algorithms, the transmission of information regarding significant coefficients is progressive (i.e., the encoder sends coefficient information one bit plane at a time, from highest to lowest). Therefore, these algorithms produce fully embedded bitstreams which can be partially decoded up to any rate or distortion. An example of a tree-structured coding algorithm is the Set Partitioning in Hierarchical Trees (SPIHT) algorithm (See U.S. Pat. No. 5,764,807). A limiting feature of these Class I algorithms is that they use a fixed logarithmic (octave-band) wavelet decomposition which does not always de-correlate image signals efficiently.

Class II algorithms, however, focus on adapting a wavelet packet transform to images by optimizing the frequency decomposition with respect to a rate distortion metric, thus optimizing the frequency decomposition with the objective of signal compression. These traditional wavelet packet optimization techniques neglect information about the structure of the lossy part of the compression scheme. They also result in a loss of the bitstream embedding property which is one feature that makes the use of tree-structured algorithms desirable. This neglected information can help guide the optimization procedure so as to result in beneficial wavelet packet (WP) structures.

Although wavelet packet optimization can be applied to an image prior to executing a tree-structured algorithm (e.g., SPIHT), unconstrained optimization can result in a transformed image with complicated or incoherent tree-shaped spatial relations, as will be described below. Thus, strict (unconstrained) optimization of a wavelet packet structure prior to coding using a tree-structured algorithm is not always efficient.

B. Wavelet Packets

While the classical (octave-band) wavelet transform usually provides an efficient frequency representation for images, its fixed space-frequency tiling does not always match the spectrum of input images. In fact, it has been shown that only those images with exponentially decaying power spectra are efficiently de-correlated by wavelet decomposition. Wavelet packets provide a rich library of transforms (i.e., frequency decompositions) from which, transforms adapted to images can be chosen. An algorithm for the choice of a best wavelet packet basis was first proposed K. Ramchandran and M. Vetterli, "Best wavelet packet bases in a rate-distortion sense" *IEEE Transactions on Image Processing*, vol. 2 no. 2, pp. 160–175, April 1993, which is incorporated herein by reference. The Ramchandran & Vetterli algorithm optimizes the wavelet packet selection in a rate-distortion sense. The wavelet transform of an image produces a two-dimensional array of wavelet coefficients. These coefficients require quantization (i.e., assignment of a discrete integer value within a set of values). For example, for a linear quantizer with step size 16, the set of quantized coefficient values could be (−64, −48, −32, −16, 0, 16, 32, 48), corresponding to quantization indexes (0, 1, 2, ..., 7). Thus, rather than sending the quantized value itself, its index "i" is sent representative of the particular quantized value. An example of such quantization is shown by applying a simple fixed-step scalar quantizer. The rate assigned to a quantized coefficient is estimated by its first order entropy, $r_c = -\log_2(p_i)$, where $p_i$ denotes the probability of the index i assigned to coefficient c. The rate R for a subband is the sum of the rates of all its quantized coefficients.

Distortion is measured in the mean-squared-error (MSE) sense in the transform domain. MSE is the mean of squared differences between a coefficient and its quantized value. The MSE is a reasonable approximation of distortion in the image domain, provided that the wavelet basis is close to orthonormal, which is the case for the widely used 7/9 tap wavelet, as disclosed in M. Antonini, M. Barlaud, P.Mathieu and I. Daubechies, "Image coding using wavelet transform," *IEEE Transactions on Image*, vol. 1, pp. 205–221, April 1992, which is incorporated herein by reference.

Figure 1:
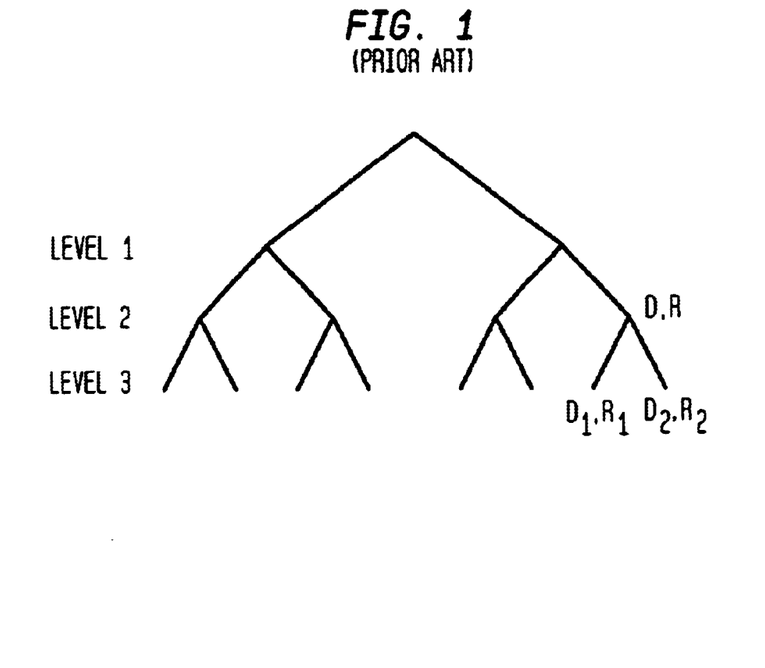
FIG. 1 is a diagrammatic representation of a balanced frequency tree generated by a wavelet packet algorithm of the prior art.

Referring to FIG. 1, the Ramchandran & Vetterli algorithm starts by growing a balanced frequency tree of depth L, where L equals the number of levels. FIG. 1 illustrates the one-dimensional case, with L=3. Starting at level k=L, pruning of each pair of level k nodes in the tree is conditionally performed based on the rate-distortion criterion:

$$\text{Prune if: } D + \lambda R < (D_1 + \lambda R_1) + (D_2 + \lambda R_2), \quad (1)$$

where $D_1$, $D_2$, $R_1$, $R_2$ indicate distortion and rate for two sub-bands at level k, and D, R indicate the distortion and rate for the synthesized sub-band at level k-1, and $\lambda$ is an empirically chosen parameter. In the 2D case, four sets of distortion and rate need to be computed at level k. The algorithm then proceeds to attempt pruning at the next level and so on all the way to the root of the frequency tree.

In the frequency tree of FIG. 1, a parent node and its children exist in the same frequency band. Thus, the relation of a parent to its children is referred to as frequency co-location. It is important to note that at any one time in the design of the optimal transform, either a parent exists or its children, but never both. This is opposite to the spatial parent-children relationships that are described hereinbelow.

C. Tree-Structured Coding

Figure 2A:
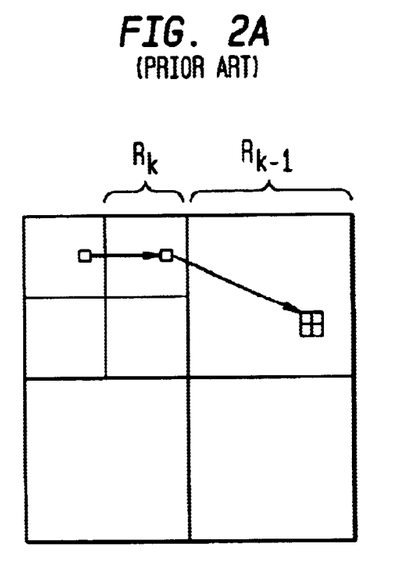
FIG. 2a is diagrammatic representation of a wavelet transform generated by a SPIHT algorithm of the prior art.

The concept of tree-structured coding presented in J. Shapiro, "Embedded image coding using zerotrees of wavelet coefficients," *IEEE Transactions on Signal Processing*, vol. 41, pp. 3445–3462, December 1993 (which is incorporated herein by reference), relies on a classical sub-band/ wavelet decomposition of an image to level L. Wavelet coefficients are then organized in spatial hierarchical trees, as illustrated in FIG. 2a, where a parent coefficient in a sub-band at level k gives rise to four children (or offspring) coefficients at level k-1. Similarly, the frequency band $R_k$ in FIG. 2a is referred to as the parent region to the spatial offspring region $R_{k-1}$.

In this case, the parent and its set of children coefficients correspond to the same spatial region in the original image. This property of two sets of coefficients is referred to as spatial co-location. The concept of zerotrees as proposed by Shapiro offers an efficient way to encode insignificant coefficients by exploiting both the predictability of spatially co-located significant coefficients, and the tendency of insignificant coefficients to exist in trees.

D. SPIHT Algorithm

The efficiency of Shapiro's algorithm has since been improved by introducing more flexibility in the definition of zerotrees and finding a way to encode the location of these trees without a need for side information (See, A. Said, W. A. Perlman, "A new, fast, and efficient image codec based on set partitioning in hierarchical trees," *IEEE Transactions on Circuits and Systems for Video Technology*, vol. 6, pp. 243–250, June 1996, which is incorporated herein by reference). The SPIHT algorithm is widely recognized as one of the best still image coders available.

SPIHT assumes an orthonormal or bi-orthonormal wavelet transform decomposition of an image which ensures that mean-squared-error (MSE) distortion due to quantization is very similar in the transform and image domains. This results in the fact that the $n^{th}$ most significant bits of any two coefficients in the transformed image contribute equally to MSE reduction. The SPIHT algorithm produces fully embedded bitstreams, i.e., bitstreams that can be partially decoded up to any specified rate lower than the encoding rate, by progressively transmitting individual coefficient values from most significant to least significant bit.

SUMMARY OF THE INVENTION

It is an object of the present invention to preserve coherent relationships between parent coefficients and their respective four spatial offspring at each step in the optimization of the wavelet packet structure. This and other objects are achieved in accordance with the present invention for optimizing a wavelet packet structure for tree-structured coding in which a valid frequency tree representing an image is defined. The tree has at least one level, parent regions and offspring regions. The frequency tree is sequentially pruned by forcing a selection of valid frequency trees at each step of the construction of the wavelet packet structure. A tree-structured coding algorithm is applied to the sequentially pruned final frequency tree to code the image.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings wherein like reference numerals denote similar elements throughout the views:

FIG. 3b is a diagrammatic representation of a first step of re-ordering of the wavelet packet structure shown in FIG. 3a;

DETAILED DESCRIPTION OF THE PRESENTLY PREFERRED EMBODIMENTS

As mentioned above, the transmission of digital video requires compression and decompression. The coding or compression of images is performed by breaking down the image into coherent parts that are based on such things as frequency, pixel location, etc. The techniques described herein are equally applicable to inter-frame coding which is commonly used in video coding algorithms (e.g., ISO standards, MPEGI, MPEGII) when one wants to achieve a higher compression ratio. A wavelet packet structure is a frequency dependent structure that is generated during coding of an image. The wavelet packet structure produced from wavelet packet decomposition techniques is intimately tied to the frequency domain representation of an image, and is used to determine a partitioning of the image spectrum into sub-bands (i.e., frequency bands) of various sizes.

In a basic wavelet decomposition, the spatial position of the offspring (O) of a parent at coordinates (i, j) may be defined as follows:

$$O(i, j) = \{(2i, 2j), (2i, 2j+1), (2i+1, 2j), (2i+1, 2j+1)\} \quad (2)$$

where each of the offspring occupies a region in the original image equivalent to one quarter the spatial size of its parent.

Figure 2B:
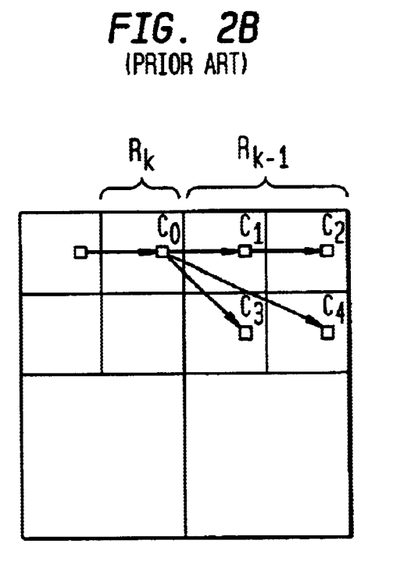
FIG. 2b is a diagrammatic representation of an arbitrary wavelet packet decomposition according to the prior art.

However, a general wavelet packet decomposition may result in more complex parent-offspring relationships and even incoherent ones. FIG. 2b demonstrates a case where a coefficient ($C_0$) can be the parent of four coefficients ($C_1$, $C_2$, $C_3$, $C_4$) which do not exist in the same sub-band, but four neighboring sub-bands. This relationship can be considered a "valid" parent-child relationship (i.e., a valid tree) because both parent and offspring occupy the same spatial region in the input image as in the classical spatial hierarchical tree case of SPIHT. Here however, each of the offspring occupies the same spatially-sized region as its parent and not one quarter as in SPIHT. The fact that $C_0$ is positioned in a lower frequency range than that of $C_1$, $C_2$, $C_3$, and $C_4$ makes it the better candidate for being a parent, because the power at lower frequencies can better predict the power at higher frequencies than vice versa.

The wavelet packet algorithm produces packet structures that give rise to very diverse spatial coefficient trees. Although the information required to represent these trees is entirely contained in the frequency tree which represents the packet structure, it is inconvenient from an implementation perspective to obtain it in this fashion. In order to simplify the coding stage of the compression algorithm, it is desirable to use simple parent-offspring relations such as those in Equation 2. Thus, a re-ordering of the coefficients can be performed which reorganizes them in an octave-band-like decomposition where the parent-child relationships of the classical wavelet structure still apply. The re-ordering of coefficients prior to tree-encoding should be accompanied by a corresponding (symmetric) stage at the decoder (i.e., the inverse re-ordering of the coefficients prior to the inverse packet transform).

Figure 3A:
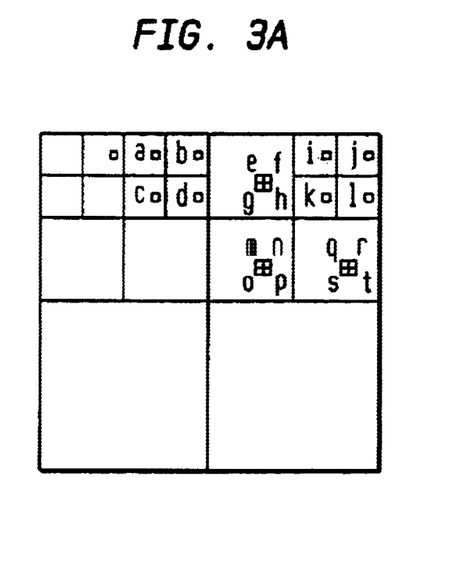
FIG. 3a is a diagrammatic representation of a hypothetical wavelet packet structure decomposition according to the present invention.
Figure 3B:
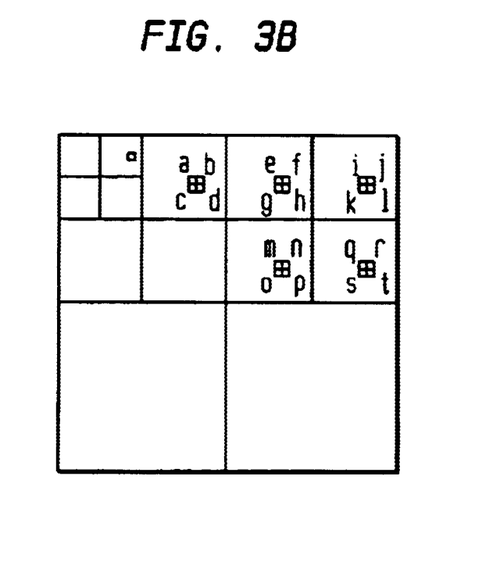
Figure 3C:
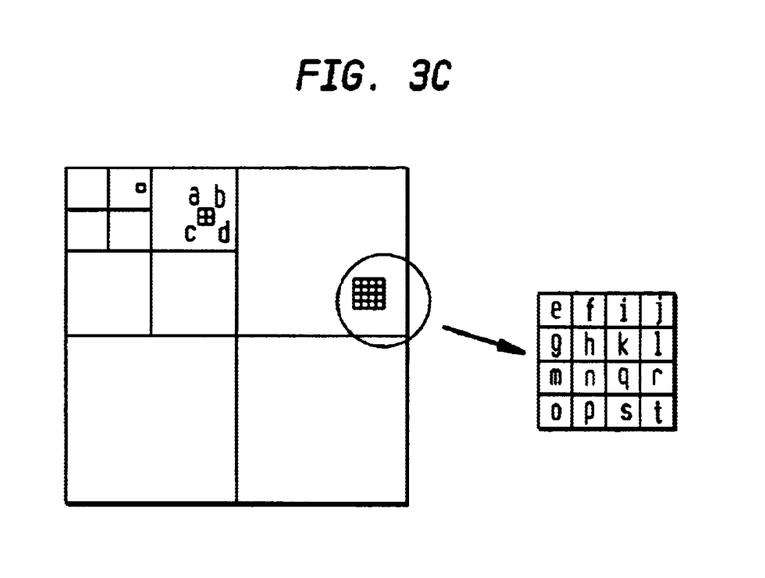
FIG. 3c is a diagrammatic representation of a second and final step of re-ordering of the wavelet packet structure shown in FIG. 3b.

FIGS. 3a to 3c demonstrate this process. For a wavelet packet decomposition tree of height L, blocks of size $2^{(L-k)} \times 2^{(L-k)}$ in a sub-band at level k will be moved together as one unit. The re-ordering algorithm proceeds by handling regions two sub-bands by two sub-bands in size, starting with the smallest sub-bands. FIGS. 3a and 3b show how the coefficients are re-ordered in 1×1 units in these sub-bands. As shown, coefficients a, b, c and d in FIG. 3a are re-ordered into the 2×2 block "a, b, c, d" in FIG. 3b. After re-ordering coefficients in all such sub-bands, it appears as if all of the small-sized sub-bands have been eliminated, and the algorithm can proceed to the next larger sub-band size. At the next larger sub-band, the re-ordering of coefficients is performed by moving coefficients in 2×2 units. As shown in FIG. 3c, the coefficients e through h, i through l, m through p and q through t are re-ordered into one single 4×4 block. This re-ordering is continued, each time doubling the unit size, until the whole tree is exhausted. It is important to note that this procedure is performed such that the lowest frequency sub-band is always left intact so that the final result of this re-ordering algorithm resembles a simple octave-band decomposition.

Wavelet packets produce an image-adaptive transform that is optimal in the rate-distortion sense and generally assumes linear quantization of sub-band coefficients. This is considered a fairly unsophisticated quantization strategy that is also used by SPIHT. Thus, it would seem that merging the two approaches would produce very good results. However, this is not necessarily the case. The (unconstrained) wavelet packet structure obtained by the algorithm described previously can be poorly matched to subsequent tree-coding.

Figure 4A:
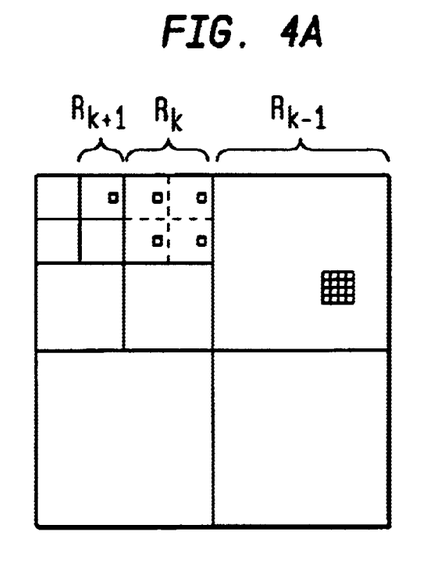
FIG. 4a is an exemplary representation of an unconstrained wavelet packet structure generated by a wavelet packet algorithm that leads to degenerate spatial hierarchical trees.
Figure 4B:
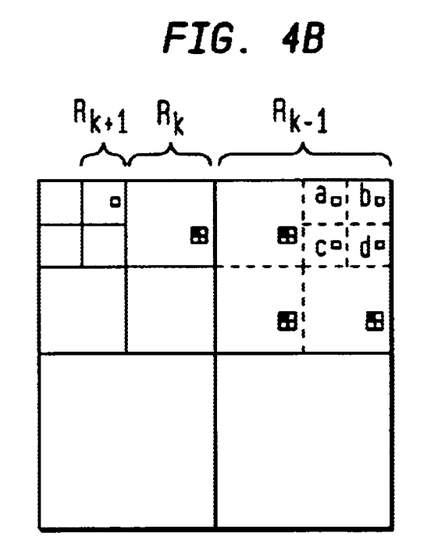
FIG. 4b is another exemplary representation of an unconstrained wavelet packet structure generated by a wavelet packet algorithm that leads to degenerate spatial hierarchical trees.

This mismatch can occur when merging a wavelet packet algorithm with a tree-structured coding algorithm. FIGS. 4a and 4b show two hypothetical wavelet packet structures graphically illustrating this mismatch concept. In each case, an attempt is made to define a coherent one-to-four parent-offspring relationship from the parent region $R_k$ to the offspring region $R_{k-1}$ that is four times the size of $R_k$.

Referring to FIG. 4a, each of the four coefficients in region $R_k$ are spatially co-located with a 4×4 area in region $R_{k-1}$. In FIG. 4b, while the top left parent coefficient in region $R_k$ has three spatially co-located children in region $R_{k-1}$, there is no clear choice for a fourth. In fact, any of the coefficients a, b, c or d have an equivalent spatial size of four times that of the shaded ones, and would thus not be a meaningful candidate for a child of the top left coefficient in $R_k$. Therefore, in either case of FIGS. 4a or 4a, no amount of re-ordering of region coefficients would produce coherent one-to-four parent-offspring relationships as mandated by the SPIHT algorithm (i.e., the wavelet packers of FIGS. 4a and 4b are ill-suited for tree-structured coding). Arbitrary choices could be made, but they will typically lead to coding inefficiency.

In order to prevent the occurrence of problematic wavelet packet structures as described with reference to FIGS. 4a and 4b, a constraint is placed on the wavelet packet construction in the Ramchandran & Vetterli algorithm. The objective of the constrained algorithm is to preserve coherent relationships between parent coefficients and their four children at each step in the optimization of the wavelet packet structure.

A valid frequency tree is defined to be one for which parent regions (in the (spatial) tree-structuring sense) consist of sub-bands that are at the same frequency decomposition level as or one level above their corresponding sub-bands in the offspring region. The (octave-band) wavelet case is of course valid since a parent region always consists of a single sub-band at one frequency decomposition level higher than its (single sub-band) offspring region.

The constraint introduced into the classical tree-pruning algorithm consists of forcing the algorithm to select valid frequency trees at each step. In order to achieve this, two pruning rules are added to the rate-distortion criterion described in Equation 1:

Rule A: Any four child sub-bands will be considered as candidates for pruning only if their current frequency decomposition level is the same as that of the spatially co-located parent sub-band; and Rule B: When pruning parents, their spatially co-located child sub-bands may need to be pruned also in order to maintain a valid tree structure.

Figure 5A:
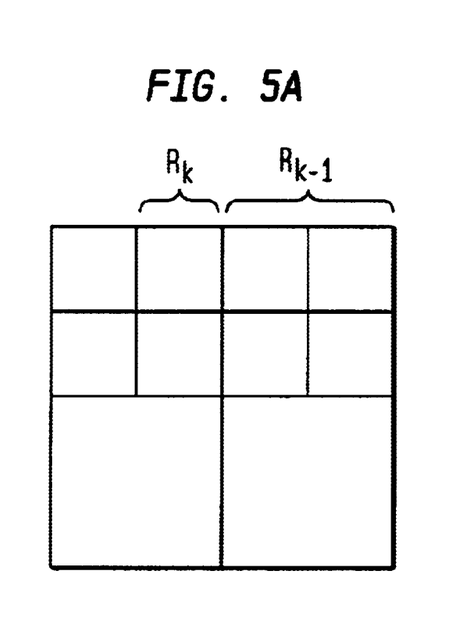
FIG. 5a is a diagrammatic representation of a current packet structure.
Figure 5B:
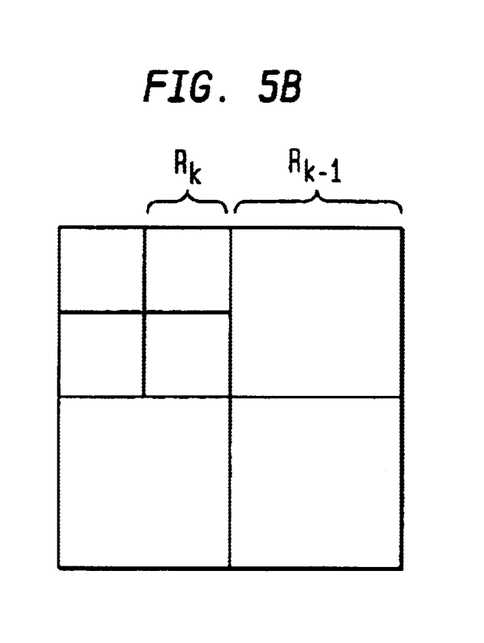
FIG. 5b is a diagrammatic representations of the packet structure of FIG. 5a after pruning of the offspring region in accordance with an embodiment of the present invention.
Figure 6A:
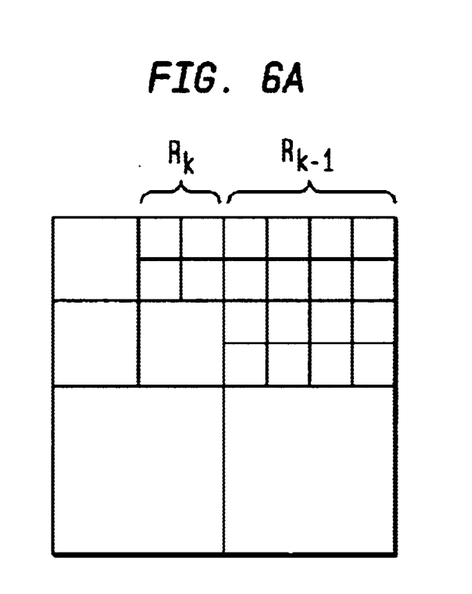
FIG. 6a is a diagrammatic representation of a current packet structure.
Figure 6B:
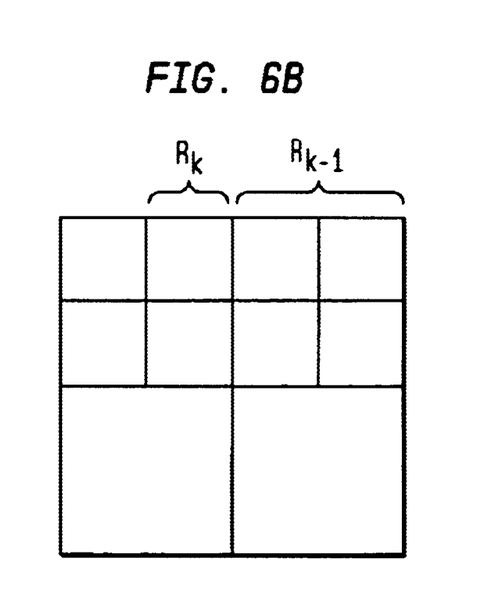
FIG. 6b is a diagrammatic representation of the packet structure of FIG. 6a after pruning of the parent region and subsequent pruning of the offspring region to maintain a valid structure according to an embodiment of the invention.

After applying Rule A, the difference in frequency level between the spatially co-located parent and children will be at most one level, or could end up being at the same level which is valid. An example of the pruning step performed under Rule A is shown in FIG. 5. Rule B may require that all spatially co-located children be pruned by one frequency level. An example of the pruning step performed under Rule B is shown in FIG. 6.

Figure 10:
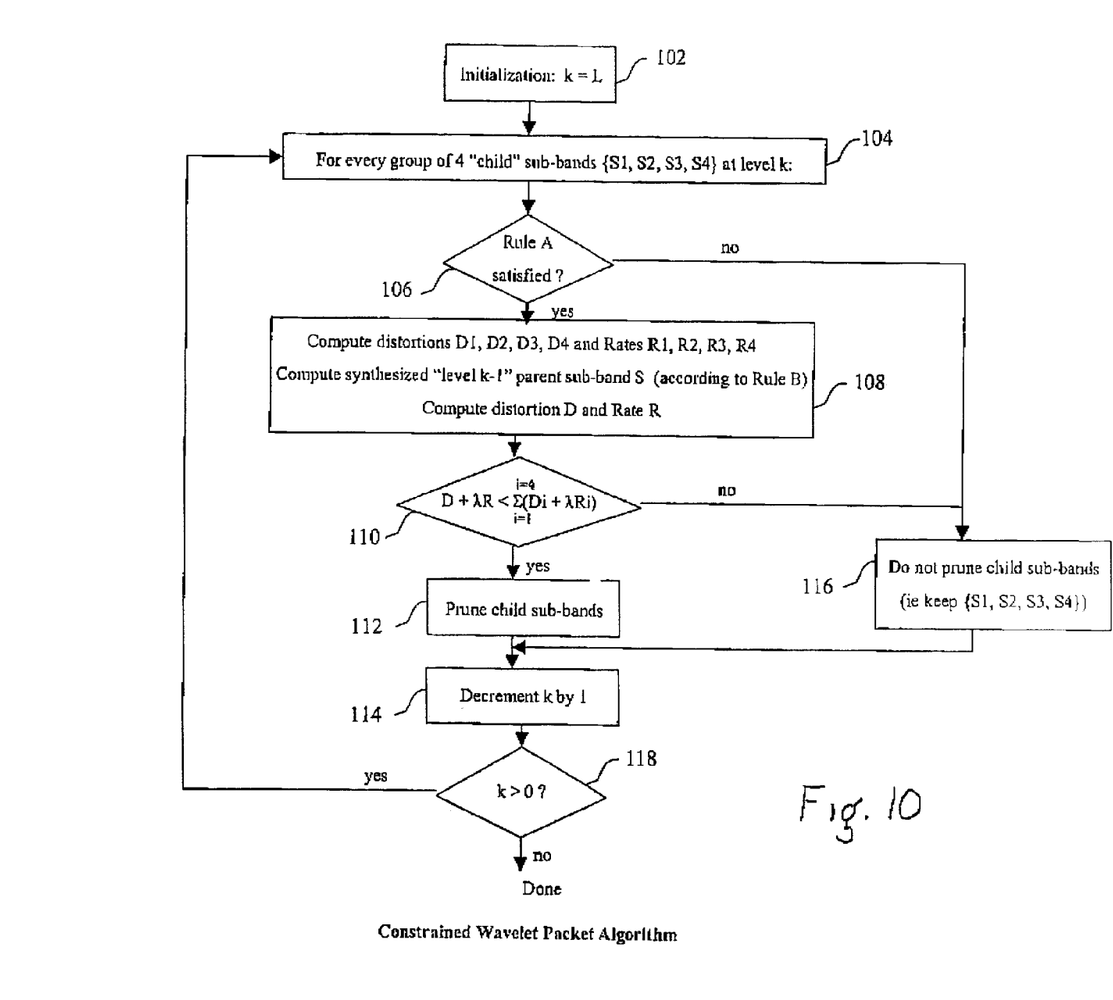
FIG. 10 is a flowchart illustrating a method in accordance with the principles of the invention.

FIG. 10 is a flowchart of an embodiment of the inventive method. Prior to beginning coding, it is assumed that a frequency tree depth L has been chosen. For the two dimensional case (the case for images), initialization occurs at step 102 where k=L. At step 104 each quadruplet of four child sub-bands at level k is considered as a candidate for pruning, subject to the first part constraint of Rule A. Step 106 determines if Rule A is satisfied. If yes, proceed to step 108 where the distortions D1, D2, D3, D4 and Rates R1, R2, R3, R4 are computed. Also, at step 108, if Rule B is to be used the synthesized parent sub-band S at level (k-1) is computed according to that rule and distortion D and rate R are computed. Proceeding to step 110, based on relationship (1), a decision is made as to whether there should be pruning. If yes, go to step 112 and prune child sub-bands. If no, go to step 116 and the child sub-bands are not pruned. From step 112 or step 116, whichever is appropriate, go to step 114 where k is decremented by 1. At step 118 the value of k relative to 0 is determined. If k is not greater than 0 then the method is complete. If k is larger than 0, the process returns to step 104. Returning to step 106, if Rule A is not satisfied, proceed to step 116 rather than step 108, and the child sub-bands are not pruned. From there, proceed to step 114.

In another embodiment of the present invention, Rule B (as a whole) is optional. The resulting algorithm applying Rule A would be a much simpler one, but would still lead to valid frequency trees. However, minimal pruning would typically lead to worse results than those obtained with the full algorithm, defined by include both Rules A and B.

TABLE 1

| Image | Octave-Band Decomposition | Unconstrained Wavelet Packet Decomposition | Constrained Wavelet Packet Decomposition (Inventive Method) |
| --- | --- | --- | --- |
| Barbara | 31.36 | 32.52 | 32.61 |
| Goldhill | 33.06 | 32.7 | 33.12 |
| Bridge | 27.12 | 26.47 | 26.88 |
| Sailboat | 31.5 | 30.86 | 31.33 |

Table 1 illustrates the comparative peak signal-to-noise ratio (PSNR) results obtained with octave-band decomposition, unconstrained wavelet packet decomposition, and the constrained (optimized) wavelet packet decomposition algorithm of the present invention. Four images entitled "Barbara", "Goldhill", "Bridge" and "Sailboat" were used. The bit rate for all test images was fixed at 0.5 bpp. The wavelet packet algorithm was run with a fixed quantization step of q=8, and $\lambda$=16. Six levels of frequency decomposition were performed, and the re-ordering of the wavelet packet coefficients in both the constrained and unconstrained case was performed according to previously described procedure.

It can be seen from Table 1 that the constrained algorithm of the present invention provides a consistent improvement over its unconstrained counterpart because of an increased PSNR. Since the increase in complexity of the wavelet packet optimization is not significant, the constrained algorithm can be regarded as beneficial to tree based coders such as the SPIHT and Shapiro's zerotree coder. In addition, a close examination of the results depicted in Table 1 indicate that for some images, the simple octave-band decomposition sometimes performs better than the more complex wavelet packet decomposition. This is because the wavelet packet optimization algorithm assumes that a uniform quantizer will be used to quantize all coefficients and that all the coefficients will be represented by entropy-encoded indices. If an octave-band decomposition is optimal in that sense, then the wavelet packet optimization will result in the simple octave-band decomposition as a final solution. Such is the case for the "Lena" image, but this (simple and fast) hypothetical coder is significantly different from the more-efficient tree coders such as SPIHT. To maximize its efficiency, SPIHT relies on finding trees with many insignificant coefficients.

In another contemplated embodiment, both the classical wavelet structure and the constrained wavelet structure of the present invention are built, and a determination is made as to which provides better results. Tree-structured coding may then be applied to the wavelet structure having the better results. This embodiment will require the encoder to work twice as hard as it would otherwise, however, the results can potentially be worth the extra processing involved.

Figure 7A:
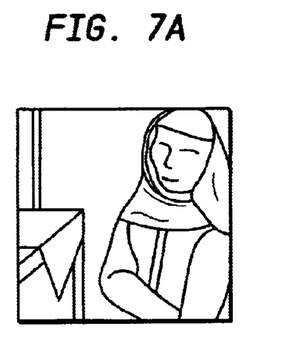
FIG. 7a is an exemplary image for testing the method of the present invention.
Figure 7B:
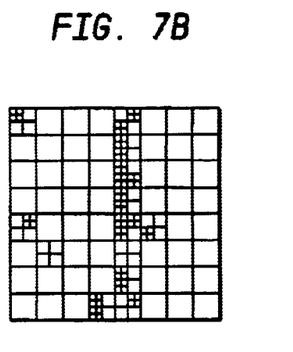
FIG. 7b is a diagrammatic representation of the unconstrained wavelet packet decomposition structure generated by the prior art methods.
Figure 7C:
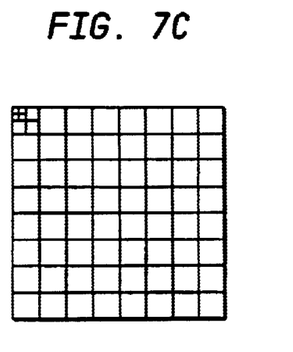
FIG. 7c is a diagrammatic representation of the constrained wavelet packet decomposition structure according to the method of the present invention.
Figure 8A:
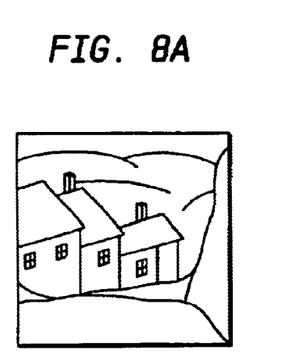
FIG. 8a is another exemplary image for testing the method of the present invention.
Figure 8B:
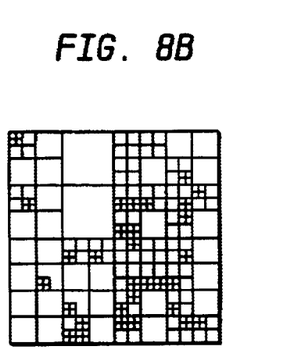
FIG. 8b is a diagrammatic representation of the unconstrained wavelet packet decomposition structure generated by the prior art methods.
Figure 8C:
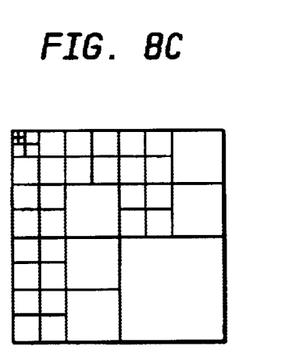
FIG. 8c is a diagrammatic representation of the constrained wavelet packet decomposition structure according to the method of the present invention.
Figure 9A:
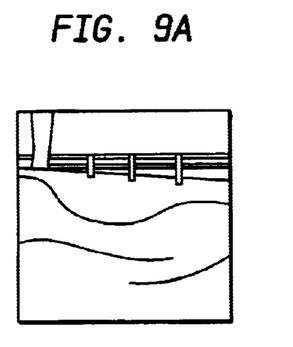
FIG. 9a is another exemplary image for testing the method of the present invention.
Figure 9B:
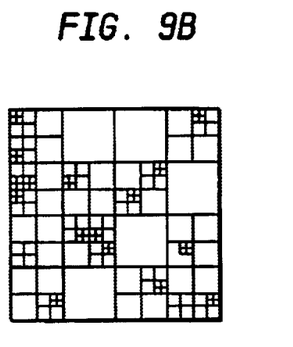
FIG. 9b is a diagrammatic representation of the unconstrained wavelet packet decomposition structure generated by the prior art methods.
Figure 9C:
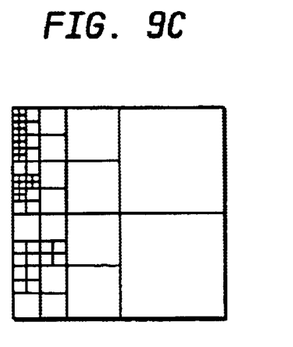
FIG. 9c is a diagrammatic representation of the constrained wavelet packet decomposition structure according to the method of the present invention.

FIGS. 7a–7c, 8a–8c and 9a–9c show three test images with their corresponding unconstrained and constrained wavelet packet decomposition. FIG. 7a is the "Barbara" referred to in Table 1. As shown in FIG. 7b, the unconstrained wavelet packet decomposition of the "Barbara" image shows many incoherent parent/children relationships for the wavelet coefficients which leads to degenerate spatial hierarchical trees. Thus, subsequent tree-structure coding with the packet structure shown in FIG. 7b will provide many mismatches and will result in inefficient tree-structured coding. FIG. 7c shows the constrained wavelet packet decomposition of the "Barbara" image according to the method set forth in the present invention. Thus, it is clear that by constraining the wavelet packet decomposition algorithm, coherent parent/children relationships are maintained, thereby providing an optimized wavelet packet structure which can be easily tree-structure coded. The examples represented by the "Goldhill" image of FIG. 8a and the "Bridge" image of FIG. 9a also show that the unconstrained wavelet packet decomposition (FIGS. 8b and 9b, respectively) results in many incoherent parent/children relationships that, when subsequently tree-structured coded, will result in mismatches. FIGS. 8c and 9c show the results of the constrained wavelet packet decomposition of the images of FIG. 8a and 9a, respectively. As shown, the constrained wavelet packet decomposition results in significantly more coherent parent/children relationships that ultimately results in more efficient and accurate tree-structured coded images.

All image processing of the type described herein is generally performed using a processor having suitable programming and at least one memory device operatively connected to the processor for storing predetermined information relating to the image coding/decoding and enabling selective access to the stored information as needed.

While there have been shown and described and pointed out fundamental novel features of the invention as applied to preferred embodiments thereof, it will be understood that various omissions and substitutions and changes in the form and details of the methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A method for coding an image comprising the steps of:

performing wavelet packet decomposition of the image to generate a wavelet packet structure with coherent and incoherent spatial relationships between parent coefficients in a parent region and corresponding offspring coefficients in an offspring region, wherein a coherent spatial relationship exists if all of the corresponding offspring coefficients are spatially adjacent, and wherein an incoherent spatial relationship exists if at least two of the corresponding offspring coefficients are spatially apart;

imposing a constraint on said performing step to maintain the coherent spatial relationships and to remove the incoherent spatial relationships in the generated wavelet packet structure; and tree-structured coding the wavelet packet structure with the imposed constraint.

2. The method of claim 1, wherein said imposition of a constraint comprises the steps of:

considering any four offspring sub-bands (in an offspring region) as candidates for pruning only if their current frequency decomposition level is the same as that of their spatially co-located parent sub-band (in the parent region); and pruning spatially co-located offspring sub-bands when pruning only the corresponding parent bands results in an invalid wavelet packet structure.

3. A method for optimizing a wavelet packet structure for tree-structured image coding comprising the steps of:

defining a valid frequency tree representing an image as having parent regions of sub-bands at one of the same frequency decomposition level as and one level above their corresponding sub-bands in the offspring region;

sequentially pruning the defined frequency tree to code the image, said sequential pruning comprising forcing a selection of valid frequency trees at each step of offspring sub-bands if the current frequency decomposition level of the offspring sub-band is the same as the spatially co-located parent sub-band, wherein said step of sequentially pruning includes considering any four offspring sub-bands in the offspring regions as candidates for pruning only if their current decomposition level is the same as that of a spatially co-located parent sub-band in the parent region and pruning spatially co-located offspring sub-bands when pruning only the corresponding parent sub-bands results in an invalid wavelet packet structure; and applying a tree-structured coding algorithm to the sequentially pruned defined frequency tree to code the image.

4. The method of claim 3, wherein said steps of defining a valid frequency tree and sequentially pruning further comprises:

when pruning a parent, pruning its spatially co-located child sub-bands to maintain a valid tree structure.

5. The method of claim 4, further comprising the step of preserving coherent spatial relationships between parent coefficients in the parent region and their corresponding four offspring coefficients at each level of pruning.

6. The method set forth in claim 3, wherein said step of pruning spatially co-located offspring sub-bands is optional.

* * * * *